A. H. FECHNER.
FEED TROUGH.
APPLICATION FILED MAR. 5, 1914.
1,118,850.
Patented Nov. 24, 1914.
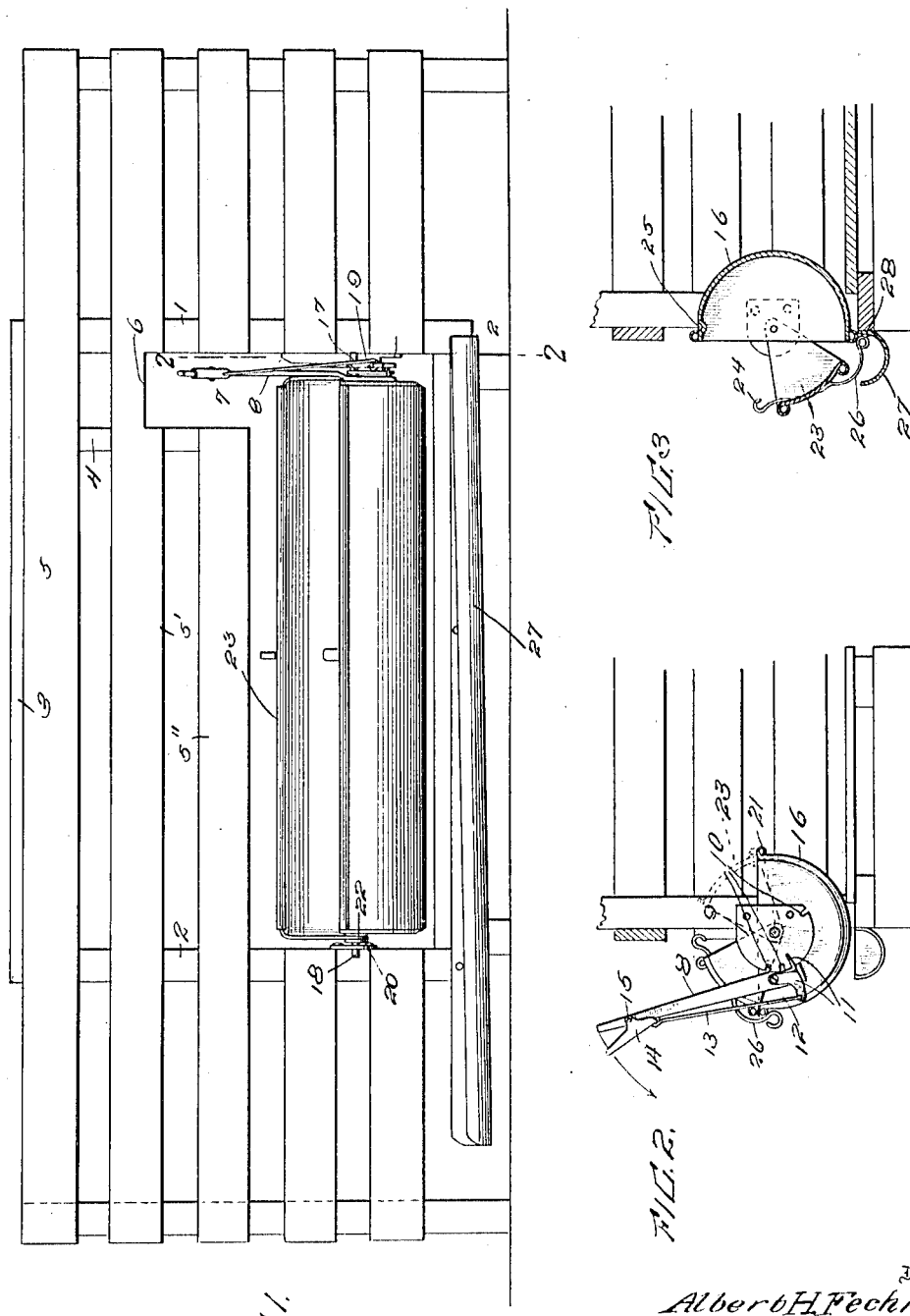

UNITED STATES PATENT OFFICE.

ALBERT H. FECHNER, OF GOLIAD, TEXAS.

FEED-TROUGH.

1,118,850.    Specification of Letters Patent.    Patented Nov. 24, 1914.

Application filed March 5, 1914. Serial No. 822,750.

*To all whom it may concern:*

Be it known that I, ALBERT H. FECHNER, a citizen of the United States, residing at Goliad, in the county of Goliad and State of Texas, have invented certain new and useful Improvements in Feed-Troughs; and I do hereby declare the following to be a full, clear, and exact description of the invention, such as will enable others skilled in the art to which it appertains to make and use the same.

This invention relates to improvements in feed troughs for animals, especially swine, etc., and an object of the invention is to provide a feed trough operated from without the pen or animal closure so constructed as to hold the trough in any one of several positions.

A further object of the invention is to provide a feed trough cylindrical in form having a pivoted member adapted to swing to hold in the contents of the trough and to deposit the same when the trough is in discharging position over a drain trough.

A further object of the invention is to provide a trough having a pivoted door conforming generally to the shape of the trough and in providing means for holding the trough in either one of two positions so that animals within the pen may not open the door while a person on the outside can readily do so.

With these and other objects in view the invention comprises certain novel constructions, combinations and arrangement of parts as will be hereinafter more fully described and claimed.

In the accompanying drawings wherein similar reference characters designate corresponding parts one form of the invention is shown.

Figure 1 is an elevation showing a portion of a pen from without showing the improved trough having the invention forming the subject matter of this invention attached thereto; Fig. 2 is a vertical section taken on line 2—2 of Fig. 1; Fig. 3 is a vertical section taken through the trough when the latter is depositing refuse to the drain trough.

The general aim of the present invention is to provide a trough having a pivoted door or cover with a handle rigid therewith carrying a rack mechanism engaging the rigid member of the pen.

The invention aims further to provide upon the swinging door a spring latch which in certain positions will serve to hold the door closed upon the main portion of the feed trough while when it is desired to deposit the refuse from the feed trough into the drain trough, this latch will automatically restrain the movement of the door, while the feed trough continues in its rotation, thereby providing a small slot between the door and opening through which the refuse may pass to the drain trough without splashing upon the person operating the feed trough.

In order that the invention may be more fully understood, a detailed description is given in the accompanying drawing. Referring to Fig. 1 the closure for the animals is shown as having uprights 1 and 2 across the top of which is a cross bar 3 which serves to support a depending auxiliary cross bar 4. The side boards 5 of the pen are of the usual construction, but the board shown at 5' is slotted as at 6, while the side board 5" therebelow is cut short and secured to the auxiliary member 4 for the purpose of defining an opening 7 through which a handle 8 may pass. Secured to the post 1 is a rack plate 9 having slots 10 formed therein for receiving the pawl 11 pivoted at 12 to the handle 8. The pawl 11 is connected by means of a rod 13 to a lever 14 pivoted as at 15 to the upper end of the handle 8.

The trough 16 to which the handle 8 is secured as seen in Fig. 3 is substantially semi-cylindrical and is provided with trunnions 17 and 18 respectively received in bearings 19 and 20 secured upon the uprights 1 and 2 respectively. The trunnions are made of sufficient length to give bearing surface to the bearings 21 and 22, secured to the swinging parti-cylindrical door 23. This door or cover 23 has the same radius as the trough 16 so that when in the position shown in Fig. 2, it forms practically a continuation of said trough.

Secured upon the interior of the door 23 is a spring latch 24 adapted to engage a detent 25 formed in the trough 16, this latch extending, as will be seen, upon the interior so that when the trough is in position shown in Fig. 2 with the door in dotted line position, it will not be possible for the swine or other animals feeding to pry up the door. Secured upon the other side and outside of the door 23 is a second spring latch 26, this spring latch 26 as seen in Fig. 3 serving to hold a door 23 to the trough 16 when the parts are in the position shown in full lines in Fig. 2. There is provided a drain trough 27 having the inner edge 28 thereof substantially under the axis of the trough.

In the operation of the trough, it will be understood that the door 23 will be swung back to the dotted line position shown in Fig. 2 so that the attendant upon the left side of Fig. 2 can deposit the feed into the trough so that the animals cannot reach over until all the feed has been deposited. By means of the latch 26, the attendant may then swing the pivoted door 23 to the position shown in full lines in Fig. 2. It will be understood that during these operations, the pawl 11 is in engagement with one of the slots 10 so that the trough does not move appreciably. In order to facilitate the feeding, the trough may be rotated by grasping the lever 14 in the well known manner and in allowing the pawl 11 to engage any of the desired slots 10. When it is desired to empty the feed trough 16 of any refuse or other material which may have remained therein after the animals have fed, the trough is rotated to the left from the position shown in Fig. 2, the rotation continuing until the latch 26 engages the edge 28 of the trough 27. A further rotation of the trough 16 results in the drawing of the trough away from the door 23 at which time the contents of the trough 16 will be deposited in the drain trough 27. In this way splashing of the contents of the trough 16 is prevented and a gradually opening passage provided for the outflow of the trough contents.

I claim:

1. A feeding device comprising a rotatably mounted feed trough, a door pivotally mounted upon the trough, a drain trough located below the feed trough and means secured to the door adapted to engage the trough, said means adapted to engage the drain trough to hold the door stationary as the feed trough rotates.

2. A feeding device comprising a rotatably mounted substantially semi-cylindrical feed trough, a parti-cylindrical door rotated upon the trough and being of less arc than 180 degrees, resilient means secured to the door adapted to engage the feed trough to lock the two together and a drain trough located under the said feed trough and adapted to engage the locking means to unlock the door from the feed trough as the latter assumes a dumping position.

3. A feeding device comprising a parti-cylindrical feed trough member, a second parti-cylindrical member, both of said parti-cylindrical members being rotatably mounted about the same axis, means secured to one of said members adapted to lock the other member, a feed trough located below the axis of rotation of said members and adapted to engage the lock to unlock said parti-cylindrical members as the trough assumes dumping position.

In testimony whereof I affix my signature in presence of two witnesses.

ALBERT H. FECHNER.

Witnesses:
WAYNE DAVIS,
P. L. CAMPBELL.

Copies of this patent may be obtained for five cents each, by addressing the "Commissioner of Patents, Washington, D. C."